E. BURROUGHS.
LIFTING JACK AND TURN TABLE FOR AUTOMOBILES.
APPLICATION FILED APR. 9, 1912.

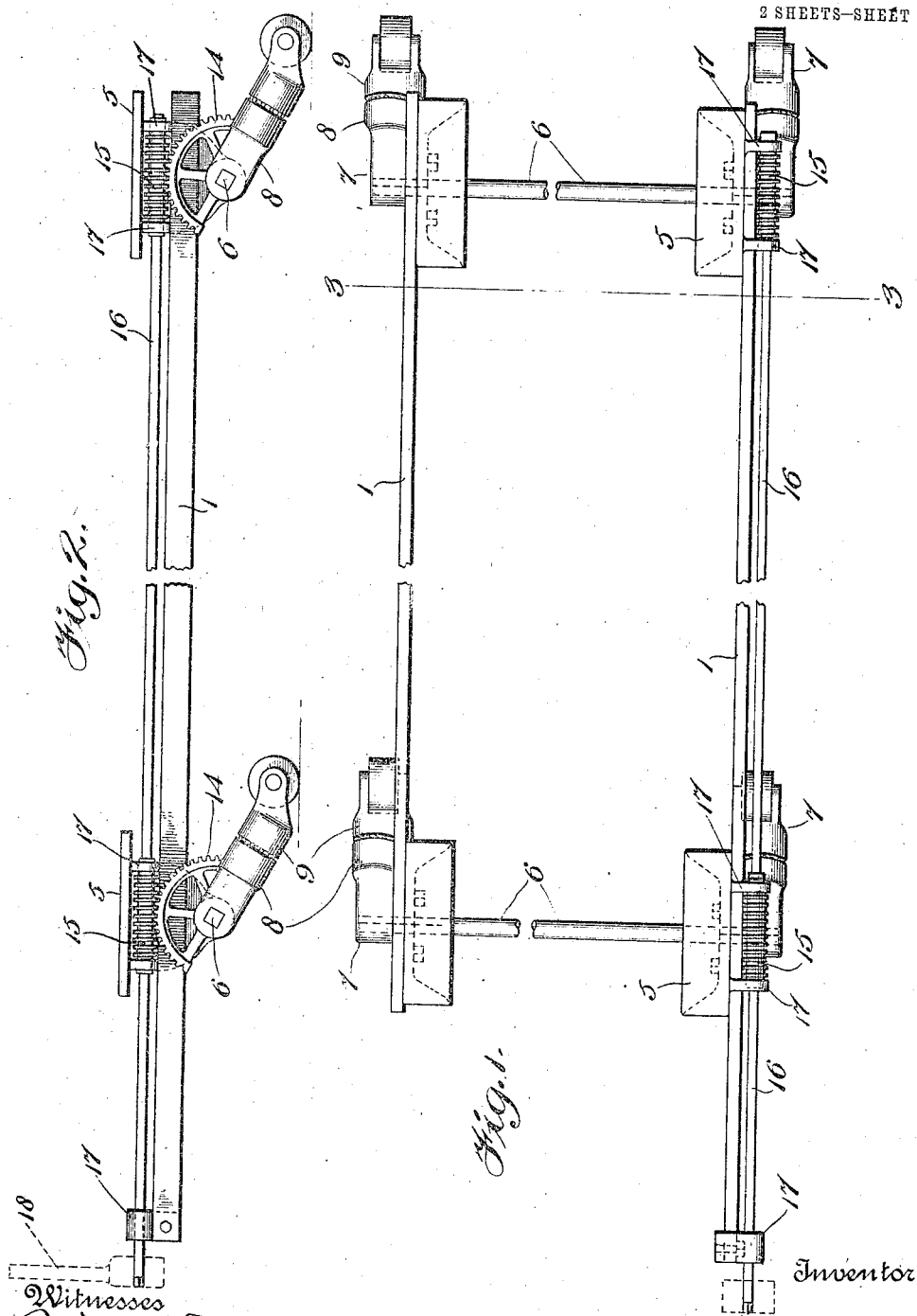

1,045,120.

Patented Nov. 26, 1912

2 SHEETS—SHEET 2.

Witnesses
W. Mau. Duvall.
H. H. Byrne.

Inventor
Eben Burroughs
by J. A. Martin

UNITED STATES PATENT OFFICE.

EBEN BURROUGHS, OF RACINE, WISCONSIN.

LIFTING-JACK AND TURN-TABLE FOR AUTOMOBILES.

1,045,120.   Specification of Letters Patent.   Patented Nov. 26, 1912.

Application filed April 9, 1912. Serial No. 689,563.

*To all whom it may concern:*

Be it known that I, EBEN BURROUGHS, a citizen of the United States, residing at Racine, in the county of Racine and State of Wisconsin, have invented certain new and useful Improvements in Lifting-Jacks and Turn-Tables for Automobiles, of which the following is a specification.

The present invention relates to a combined turning and lifting device for automobiles, and has for its object the provision of means whereby the automobile may be uniformly lifted clear of the ground, and then turned to any desired position.

With these and other objects in view, the invention consists in the novel details of construction and combinations of parts more particularly hereinafter described and claimed.

Figure 3:
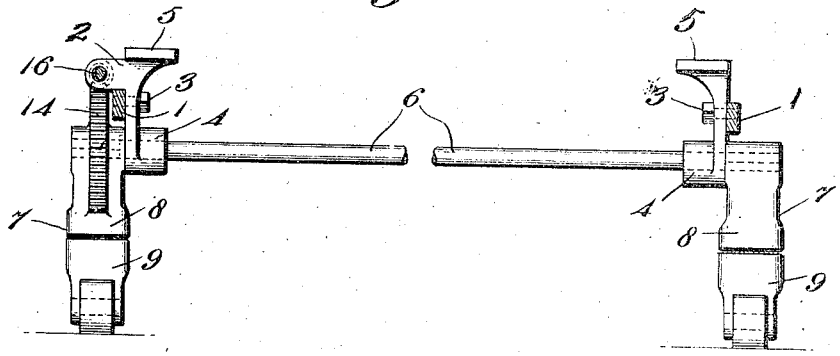
Figure 4:
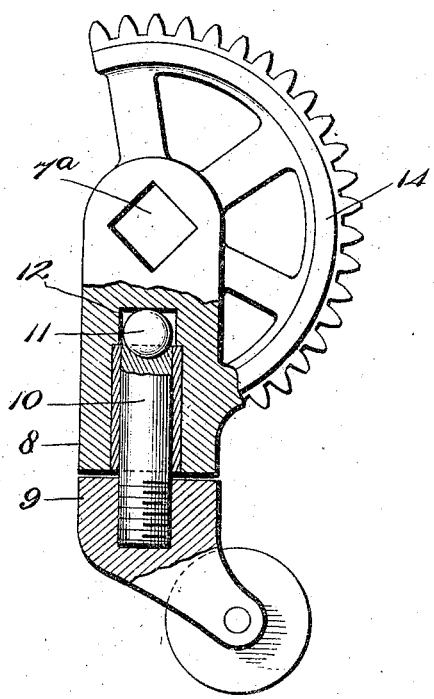

In the drawings: Figure 1 is a top plan view of my improved lifting and turning device; Fig. 2 is a side elevation thereof in its lowered position; Fig. 3 is a transverse section on the line 3—3 of Fig. 1 in its raised position; Fig. 4 is a detail view, partly in section, of the supporting caster and segment; and Fig. 5 is a detail view, partly in section, illustrating a modified form of caster.

Referring to the drawings, in which like numerals designate like parts in all the views, 1 represents side bars to which are secured brackets 2. These brackets 2 are bolted to the side bars, as at 3, and have downwardly extending portions provided with bearing supports 4, disposed at right angles thereto. A supporting plate 5 is formed integral with each bracket 2 and engages the underside of an automobile axle when it is desired to be lifted. Journaled in the lower arms of each pair of brackets is a transverse shaft 6 which extends beyond said brackets 2 and carries the casters 7. The extended portions of said shafts 6 are squared to receive the squared apertures 7ª of said casters.

The casters 7 consist each of sections 8 and 9, as best shown in Fig. 4, pivotally connected by the pintle 10. A depression is formed in the upper end of the pin 10, and receives a ball 11 upon which rests the upper section 8 of the caster. A roller bearing chamber 12 is formed within the section 8. The purpose of so constructing the caster is to eliminate as much friction as possible, and thereby insure an easy turning of the automobile when lifted.

Figure 5:
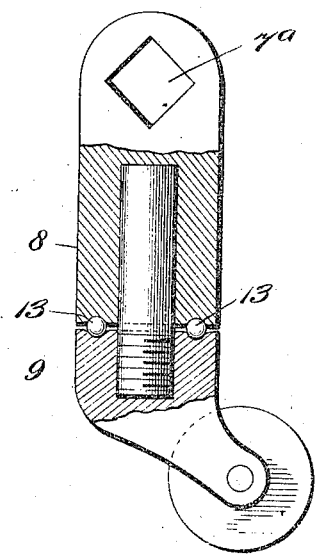

As shown in Fig. 5 of the drawings, the caster is of slightly different contour, and permits of a plurality of ball bearings 13 being utilized in facilitating the turning of the device. The upper sections 8 of one longitudinal pair of casters have formed integrally therewith the toothed segments 14. These segments are secured upon the squared ends of the shafts 6, and mesh with worm gears 15 mounted upon a longitudinally disposed shaft 16 that is journaled in lugs 17 that are formed integral with the brackets on one of the side bars 1. Each of the worm gears 15 is disposed between a pair of the lugs 17. One end of the shaft 16 has attached thereto a lever 18.

In operation, the lever 18 imparts a rotary motion to the shaft 16 to which are attached the worm gears. These being in engagement with the toothed segments 14 operate to raise or lower the casters to which they are attached. This elevation or depression of one longitudinal pair of casters is directly transmitted to those laterally opposite through shafts 6, to which said opposite casters are rigidly fixed as hereinbefore stated. The uniform raising and lowering of the entire supporting frame is thus effected.

It is obvious that those skilled in the art may vary the details of construction and combinations of parts, without departing from the spirit of my invention.

Having thus described my invention, what I claim as new and desire to protect by Letters Patent, is:—

In an automobile lift and turntable, the combination of a pair of parallel and horizontally disposed bars; a pair of brackets bolted to each of said bars, each of said brackets provided with an integrally formed supporting plate, and a downwardly extending portion having a journal bearing; a shaft journaled in the bearings of each transverse pair of said brackets, and having its ends projecting therethrough and squared; a caster mounted on each square end of said shafts, each of said casters comprising an upper section having a square hole receiving the square shaft end, and a lower section swiveled on the upper section; segmental gears formed integrally with the upper sections of the pair of casters mounted on one of the parallel bars; a pair of lugs providing journal bearings formed integrally with the brackets on said parallel bar; a shaft journaled in said pairs of lugs on said bar and adapted to be rotated by a lever; and a pair of worm gears mounted on said shaft between said lugs and meshing with the pair of segmental gears mounted on said casters, substantially as described.

In testimony whereof I affix my signature in presence of two witnesses.

EBEN BURROUGHS.

Witnesses:
THOMAS ALLEN,
HAROLD JOHNSON.